Jan. 11, 1938.  F. S. SCHADE  2,105,231
LOOSE LEAF BINDING POST CONSTRUCTION
Filed May 5, 1937
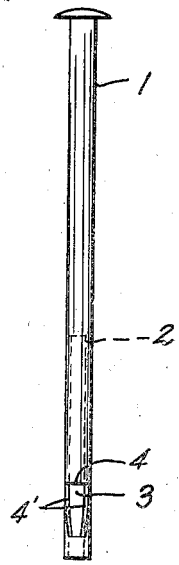
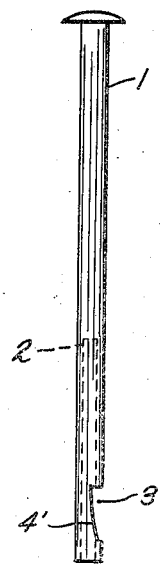
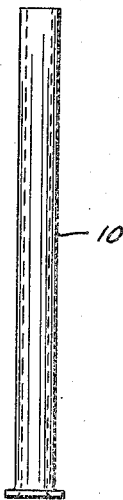
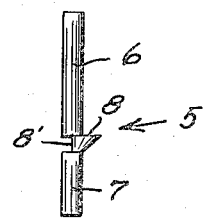
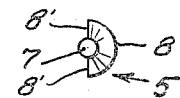
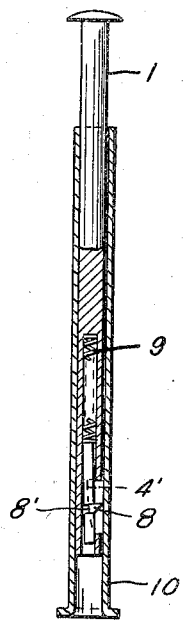
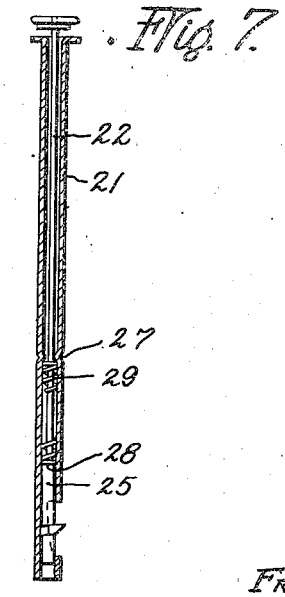
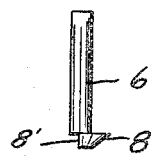
INVENTOR
FRANK STANLEY SCHADE
BY Chapin + Neal
ATTORNEYS Patented Jan. 11, 1938

2,105,231

UNITED STATES PATENT OFFICE 2,105,231

LOOSE LEAF BINDING POST CONSTRUCTION

Frank Stanley Schade, Holyoke, Mass., assignor to National Blank Book Company, Holyoke, Mass., a corporation of Massachusetts Application May 5, 1937, Serial No. 140,782

4 Claims. (Cl. 85—4)

This invention relates to an improved construction especially adapted to act as a loose leaf binder post. Constructions of the kind, and to which the improvement is directed, are sometimes referred to as a friction clutch for telescoping elements—for example in Schade Patent 1,447,519 of March 6, 1923. These telescoping posts with a friction clutch therein are used especially to pass through holes in a pack of loose leaf sheets and bind them together. They are ordinarily used to bind a pack for storage. For example, a pack of sheets with three holes in the binding margin would be bound by using three devices of the kind that I will describe, one in each hole like a bolt or a rivet.

My object is to provide a structure that is certain and convenient in operation and of low cost manufacture, as will appear, considering its purpose and function.

The improvement is disclosed in the accompanying drawing and following description.

In the drawing—

Fig. 1 is a side view of one telescoping post before the clutch element is assembled with it;

Fig. 2 is a view with the part of Fig. 1 rotated 90°;

Fig. 3 is a side view of the other telescoping post;

Fig. 4 is a detail view of the clutch element to be assembled in the post of Fig. 1;

Fig. 4—A is an end view of Fig. 4;

Fig. 5 is a sectional view of the telescoping posts clutched together;

Fig. 6 is a tool for declutching the posts of Fig. 5;

Fig. 7 is a modified form of the combination of the post shown in Fig. 1 and with a modified form of clutch element used in the assembly; and Fig. 8 is a modified form of the clutch element of Fig. 4.

The post 1 of Fig. 1 is formed like a long flat-headed rivet with an axial bore 2 at one end. Near this end there is a notch or cut-out portion 3 made in the side wall of the rivet and penetrating well into the axial bore 2. As shown, the upper wall 4 of the cut-out 3 is at right angles to the post axis. The side walls 4' of the notch 3 rise from the base of wall 4 towards the external surface of post 1 in a long slant forming a cam surface which nearly merges with the outside surface of post 1.

The clutch element 5 seen in Fig. 4 consists in a stem portion 6 and a stem portion 7 between which is a semicircular disk portion 8. All these parts are preferably made integral. This can be done by turning a rod to the form shown but with the disk portion 8 extending all around the rod. Then a part of the disk portion is cut away, as indicated in Figs. 4 and 4—A. There is left the disk portion 8, as shown. This presents a sharp integral tooth of about semi-circular extent dividing the stem portions 6 and 7.

Stem portion 6 (see Fig. 5) extends up in the axial bore 2 above wall 4 and stem portion 7 extends down in the bore below the end of side walls 4' of the cut-out portion. Disk portion 8 is thus positioned so as to lie in the cut-out portion. A spring 9 urges the element 5 downwardly in the tube. The side edges 8' of the disk portion 8 bear on the cam walls 4', and element 5, being normally pushed downwardly, the disk portion or tooth 8 is moved outwardly so as to lie beyond the side wall of post 1. The stem portions 6 and 7 have enough loose play in their guiding fit with bore 2 to permit the outward movement of tooth 8 beyond the wall of post 1. Likewise when the stem 5 with its integral disk portion or tooth 8 is pushed upwardly against spring 9, the same play of stem 5 will permit tooth 8 to move sidewise and lie within the transverse circle of the surface of post 1.

With this construction then it will be seen that when post 1 with its spring-pressed clutch element 5 is inserted inside the other tube post 10 of Fig. 3 the action is to cam tooth 8 inwardly. The inward motion is caused by the rub of the slanting side of tooth 8 against the inner walls of tube post 10. This action pushes element 5 against its spring and, as element 5 moves up in bore 2, the cam surfaces of walls 4' permit element 5 to shift sidewise until the tooth 8 has been received within the bore of tube 10. The telescoping movement of the two posts, therefore, can occur by simply pressing their heads toward one another. The only resistance to this is the force necessary to overcome spring 9 and move the whole stem sidewise with the help of the cam on the tooth 8 and the upwardly slanting side walls 4'. The resistance is small.

After the tubes have been thus telescoped together, for use as a post binder, until the heads of the posts engage opposite sides of a pack of loose leaf sheets, the binding post is in functioning position and clutched in that position.

If one now attempts to separate the telescoped posts, such separating movement is immediately and solidly resisted in the following manner. The solid tooth 8, where its slanting wall meets its wall arranged transversely to the line of attempted separation, presents a sharp edge which immediately bites into the wall of tube 10. It is urged to this biting action by spring 9 and the cam surfaces of side walls 4' of the cut-out portion. The harder the separating pull the harder the solid tooth 8 will bite because the tooth 8 is solidly supported by the cam walls 4'. The spring 9 merely holds tooth 8 in position to start the bite, while the nature of the bite taken by tooth 8 is absolutely solid in the sense that there is no spring pressure back of it. That is to say, no amount of separating force can be directed toward compressing the spring for the direction of such force is such as to permit the spring to expand. Furthermore, the nature of the bite resisting separation movement of the telescoped posts is not dependent on a pivoted part but on the solid construction of clutch element 5 with which the tooth 8 is integral. It is the solid semi-circular disk portion 8 with its semi-circular tooth edge backed up by its shoulders 8' resting solidly against cam surfaces 4' that takes all the strain to resist separating movement. And such movement cannot take place with the clutch element in position to resist it, unless the tooth 8 acts as a semi-circular cutter making a deeper and deeper cut into the wall of tube 10 as it is wedged tighter by solid cam surfaces 4' if there is any movement at all. As a matter of fact there is no separating movement possible unless the metal parts are ruptured. It will be clear that the cooperating parts for clutching the telescoping post elements together function without being dependent on delicate springs or levers, but dependent on the solid semi-circular tooth 8 and its mounting so as to bite into the metal with solid backing to resist unwanted movement.

When separating movement is wanted, the declutching tool 11 shown in Fig. 6 is used. It is simply inserted in the bore of tube 10 and pushed against the end of stem portion 7. And if post 1 is pressed toward the tube 10 the action is sufficient to loosen the clutch for tool 11 to push the clutch element along cam surfaces 4' and shift tooth 8 sidewise to release the bite of tooth 8 on the inner surface of tube 10. This will get the tooth out of clutching position for the tubes to separate. Of course the tool 11 needs to hold element 5 against any movement due to the urge of its spring 9 toward clutching position during the separating movement of the parts. It is the side play of element 5 in the bore of tube 1 that prevents any clutching action until such side play is prevented by the riding up on cam walls 4' of the shoulders 8' on the tooth 8 adapted to engage such shoulders. The tool 11 is adapted to push element 5 to an upper position in bore 2 where cam walls 4' cannot prevent the side play while spring 9 urges element 5 to its lower position where the cam walls 4' can prevent the side play. Thus, in one position the side play is permitted, while in the other it is prevented. But only with tool 11 can the position for side play be reached for separation of the tube elements 1 and 10. At all other times spring 9 urges element 5 to clutching position which permits telescoping movement but not separation.

In Fig. 7 there is shown a modification. It provides for a declutching tool as a permanent part of the telescopic post assembly. The post 21 is made like the post of Fig. 1 except that the axial bore 2 of Fig. 1 extends the length of the post, forming a tubular member with a flanged head. Rod 22 extends through the tube and is provided with clutch element 25 at its lower portion. The spring 29 is placed around rod 22, being held between a shoulder 28 on the rod and a shoulder 27 rolled in the tube wall as shown. In this case the action is the same as in the first form except that a suitable finger piece is fixed to the upper end of rod 22 to permit one to lift the rod against the spring 29 and thus move it out of clutching position. Thus, the clutch element in this modification is lifted up instead of being pushed up by an outside tool for the declutching action.

In Fig. 8 there is shown a modified form of the clutch element of Fig. 4. It is the same except that the stem element 7 of Fig. 4 is omitted.

There are many other modifications which will occur to the man skilled in making this kind of device, once the invention and its mode of operation herein are disclosed and understood.

It is not intended to limit the invention claimed to the form or forms shown in its broad aspect. In some of the details of construction as specifically described the intention is to make the disclosure complete in its preferred forms.

A convenient procedure is to make the post 1 and tube 10 of brass. The bore 2 in post 1 is made just long enough to seat spring 9 in the right position and then the notch 3 is made. The end of the post can then be bent enough at the cut-out portion to insert the stem portion 6 inside the bore 2 against the spring 9. (Referring to Fig. 2, the end of the post 1 would be bent to the left.) When the element 5 is pushed to its limit against the spring the end of stem portion 7 will be within the cut-out portion 3. Thereupon the end of the post can be bent back into alignment so that stem portion 7 will slide in the bore 2 below the cut-out portion 3.

The clutch element of Fig. 4 can be turned up from rod stock on an automatic screw machine, the rod being turned down with a circular disk in the central portion, the disk corresponding to the shape of the head of a wood screw but with the rod stock left intact above and below the head. A transverse cut is then made through the rod at the disk, removing about half the disk and leaving the clutch member with the tooth 8.

Member 10 can be made of tube stock with the end flared to produce the head.

It will now be clear that the parts of the whole assembly can be made at a low cost and assembled with convenience. When assembled, the telescoping posts and the clutch element function in the characteristic fashion above described.

What I claim is:

1. A loose leaf binding post construction comprising a rod having a head at one end and an axial bore at the other end, a coiled spring seated in the bore, a clutch element made up of a guiding stem in said bore contacting the end of the spring and an offset tooth portion on the stem having shoulders placed to ride on cam walls provided by a cut-out portion of the rod, said stem having enough side play in the bore to permit said tooth portion to lie within the transverse circle of the rod when the tooth is at one position with respect to the cam walls and to lie outside said circle when at another position with respect to the cam walls, said second position being the position to which said spring urges the clutch element, and a tubular rod adapted to freely telescope over said first rod and engage said tooth to jam it between the said cam walls and the interior walls of the second rod when the latter starts to move for separation and by the jamming action prevent said separation.

2. The structure of claim 1 in combination with manually operated means to move the clutch tooth on the cam walls so as to shift the tooth sidewise while permitting the separating movement of the two rods.

3. A loose leaf binding post construction comprising two tubular telescoping posts with heads provided at the outer end of each post, a clutch mechanism carried in the bore of the inner post, said mechanism consisting of three elements—namely, cam walls provided by a cut-out portion in the side wall of the inner post, a stem having a tooth-shaped offset portion with shoulders adapted to ride said cam walls and a spring positioned to urge the stem into position for the tooth to lie on the high part of the cam walls, said stem having enough side play for the tooth to move within the encompassing side walls of the inner post and outside said walls according to the position of the shoulders on the cam walls, all arranged for the tooth to automatically grip the interior walls of the outside post when the latter is pulled for separating movement and in said grip to resist the pulling force by the solid support of the cam walls underlying the solid tooth on the stem as the tooth bites into the outside post.

4. In combination for the purpose described, a tubular post having near one end a cut-out portion in its side wall to make an opening between the bore of the tube through the side wall, said opening having its upper wall arranged transversely of the bore and two cam walls converging from the ends of the upper wall downwardly of the post, a stem in the bore having a disk shaped like a valve seat and about half of said disk cut away to provide shoulders to engage said cam walls, the large end of said disk facing the upper end of said cut-out portion, a spring in the bore positioned to urge the disk to ride to the high part of the cam walls and there be in position for a telescoping post to ride freely over the disk in one direction but receive solid wedging resistance by the action of the disk riding on the cam walls, to a separating pull, said stem in the bore having enough side play to permit its disk to ride on the cam walls into and out of wedging position, and a second tubular post adapted to cooperate in the function described.

FRANK STANLEY SCHADE.